March 22, 1932.  J. J. M. GUEUX  1,850,322
LIQUID DISTRIBUTOR
Filed April 26, 1930    4 Sheets-Sheet 1

INVENTOR.
Joseph J. M. Gueux

By William C. Luton
Attorney.

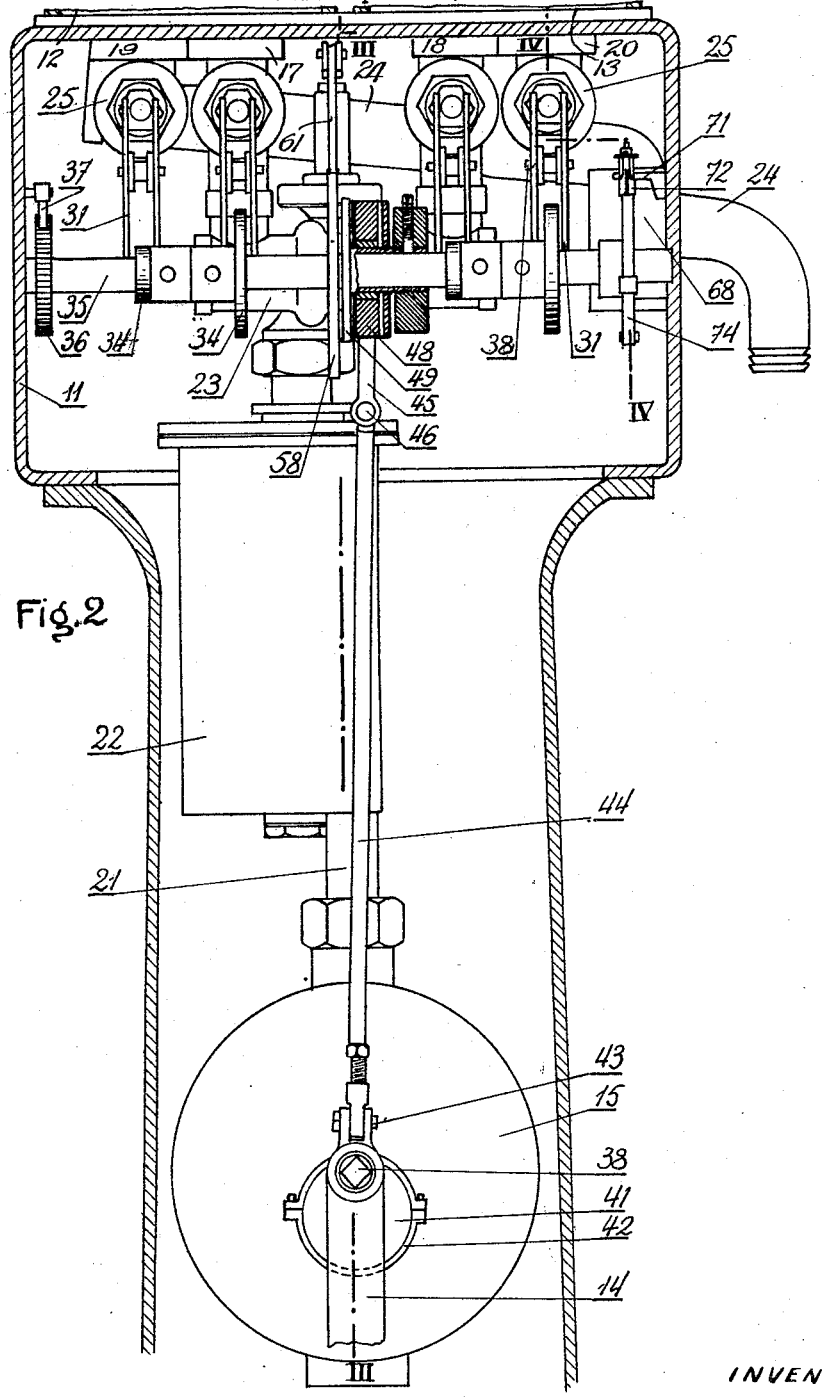

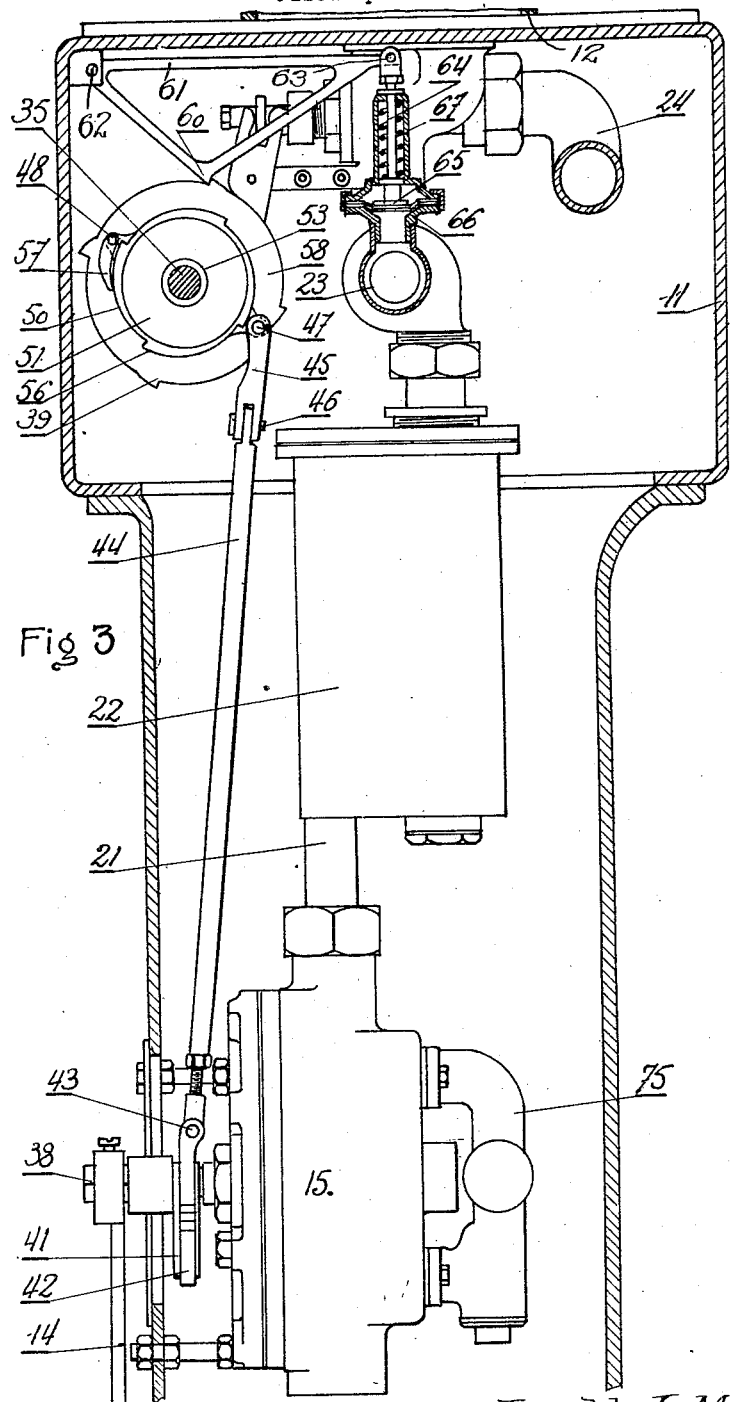

March 22, 1932.  J. J. M. GUEUX  1,850,322
LIQUID DISTRIBUTOR
Filed April 26, 1930   4 Sheets-Sheet 4

INVENTOR.
Joseph J. M. Gueux.
By William C Linton
Attorney.

Patented Mar. 22, 1932

1,850,322

UNITED STATES PATENT OFFICE

JOSEPH JEAN MARIE GUEUX, OF IVRY-SUR-SEINE, FRANCE

LIQUID DISTRIBUTOR

Application filed April 26, 1930, Serial No. 447,638, and in France June 6, 1929.

The present invention relates to improvements in the invention described and claimed in specification of U. S. patent application Ser. No. 367,536 filed on 31st May 1929 which concerns a mechanism for automatic operation of liquid distributors of the type having two dosing chambers.

According to the present invention the movements of the cam shaft which controls the operation of the four cocks of the distributor, are interlinked with the movements of the feed pump by means of a friction device and a pawl and ratchet gear constructed and arranged in such a manner that the beginning of the movement of the shaft will be produced by the friction device and the said movement will be stopped by the much more powerful action of the pawl and ratchet gear.

It has been found that only a limited force is required to start the movement of the shaft because this initial movement corresponds merely to the closing of two of the cocks and is assisted by the action of the return springs of the said cocks.

On the contrary, the end of the movement of the driving shaft corresponds to the opening of the two other cocks, and the said opening is opposed by the return springs of the said cocks.

Consequently, if this last part of the movement were ensured only by means of a friction device, the said device would have to transmit a fairly considerable power, and as will be readily understood, the friction required would cause rapid wearing out of its parts.

On the contrary, owing to the improvements according to this invention, the friction acts only at the beginning of the movement and transmits only a limited power, whilst the end of the movement is ensured by the pawl and ratchet gear, the members of which are not subject to any appreciable wear.

To this end, the pump of the apparatus operates an eccentric connected by a rod to a friction disc loosely mounted on the cam shaft but held firmly or clamped between two discs secured to the said shaft. On the other hand, the loose disc is provided at its periphery with a pawl which cooperates with ratchet teeth provided on the edge of one of the discs secured to the shaft. The pitch of the said teeth is calculated so that it is just equal to the amplitude of rotation to be made by the cam shaft.

The invention comprises other improvements in the apparatus described in the said prior specification. These improvements consist more particularly in the substitution for the manometric safety piston arranged at the top of each dosing or calibrating container, of a flexible diaphragm which is in communication with the feed manifold of the containers and is connected to a locking or stop lever cooperating with a disc with shoulders secured to the driving shaft so that the locking lever is disengaged from the said disc only when the flexible diaphragm is forced back by the pressure of the liquid contained in the admission manifold; the said pressure being produced only when one of the dosing containers is completely full.

According to a further improvement, the stuffing box hitherto utilized round the rod of each cock, is replaced by a flexible diaphragm traversed by the said rod with a perfectly tight joint and secured by its edge to the body of the cock.

The improvements according to the present invention are illustrated by way of example in the accompanying drawings in which:

Figure 2 is a view on an enlarged scale of the mechanism, with the front part of the gear case removed.

Figure 3 is a section on line III—III of Figure 2.

Figure 1:
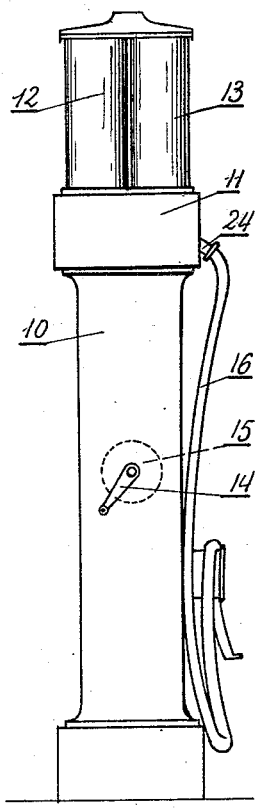
Figure 1 shows the improved liquid distributor in elevation.

The distributor shown in Figure 1 comprises substantially a base 10 supporting a gear case or casing 11 containing the operating mechanism of the distributor. This casing is surrounded by two dosing chambers 12 and 13 of the same capacity, for example five litres.

Figure 1 shows a crank 14 which operates a rotary pump 15 for pumping the liquid to be distributed into the containers 12 and 13. A flexible distribution pipe 16 completes the apparatus and enables the liquid to be delivered at some distance from it.

Each container 12 or 13 comprises as shown more particularly in Figure 2, a feed pipe such as 17 or 18 and a distributing pipe such as 19 or 20. The delivery pipe 21 of the pump 15 passes first through an air separator 22 and terminates in a feed manifold 23 from which start the feed pipes 17 and 18 of the two containers 12 and 13. As regards the distributing pipes 19 and 20, these open into a distributing manifold 24 which comes out of the distributor and is connected to the flexible or hose pipe 16.

Figure 4:
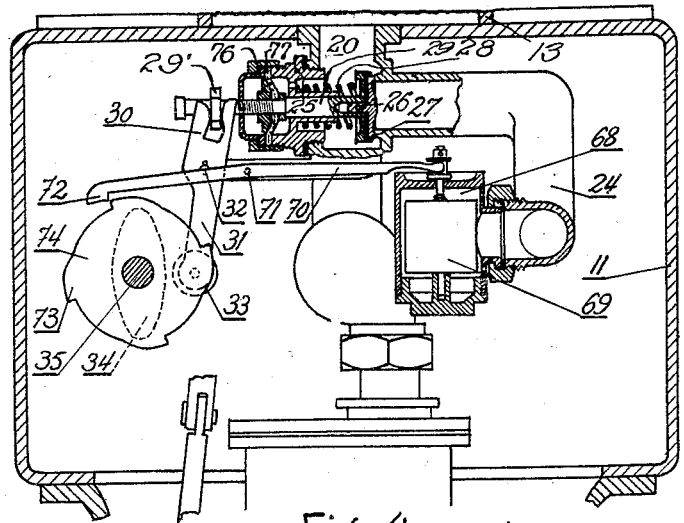
Figure 4 is a view on line IV—IV of Figure 2.

On each of the feed or distributing pipes 17, 18, 19 and 20 of the containers 12 and 13 is mounted a cock, one of the said cocks being shown in section in Figure 4.

Each of these cocks comprises substantially a flap valve 26 which may be pressed against its seat 27 by a spring 28 surrounding its rod 29. This rod passes through the body 25 of the cock and emerges therefrom where it is provided with a transverse finger 29' engaging between the branches 30 of the forked end of a lever 31 pivoted about a fixed pin 32 and terminating at its other end in a roller 33 in the path of a cam with two cam rises 34 mounted on a transverse shaft 35 extending behind the cocks.

Figure 2 shows on the transverse shaft 35 the four cams 34 the bosses of which are displaced at 90° relatively to one another.

A ratchet wheel 36 secured to the shaft 35 co-operates with a pawl 37 mounted on the casing 11 so that the shaft 35 can rotate in one direction only.

To the spindle 38 of the pump 15 of the apparatus is secured an eccentric 41 surrounded by a strap 42 which is articulated at 43 to a connecting rod 44. This connecting rod is in its turn jointed at 46 to a small connecting rod 45 attached on the other hand at 47 to the edge of a disc 48 mounted loose on the shaft 35.

It must be pointed out that the articulations or joints 43, 46 and 47 are at 90° to one another, so that the connecting rod 44 can describe a complex movement.

Figure 5:
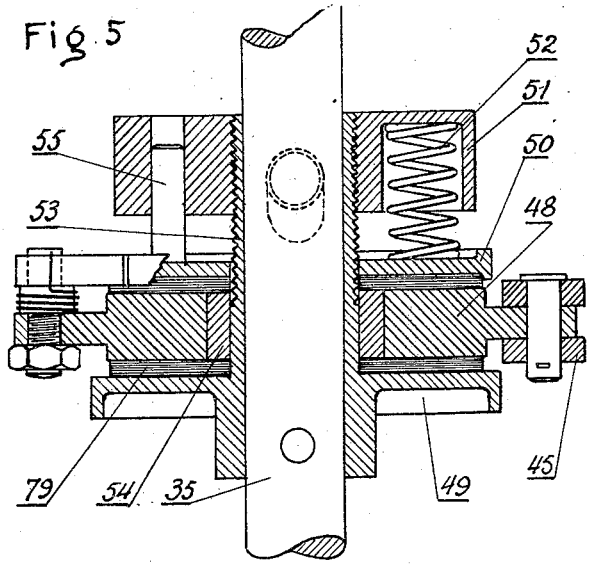
Figure 5 is a view on an enlarged scale of a part of Figure 2.

As shown in Figures 2 and 5, the disc 48 is clamped between a disc 49 secured to the shaft, and a disc 50 pressed against the disc 48 by a spring 52 mounted in a kind of nut 51 which is screwed on a tubular projection of the disc 49. On this projection is also mounted by means of a bearing or bush 54, the loose disc 48. A suitable lining 79 is interposed between the disc 48 and each of the discs 49 and 50.

The disc 50 comprises moreover, a driving finger 55 engaging with the nut 51 so that the movements of the discs 49 and 50 are interdependent.

Figure 6:
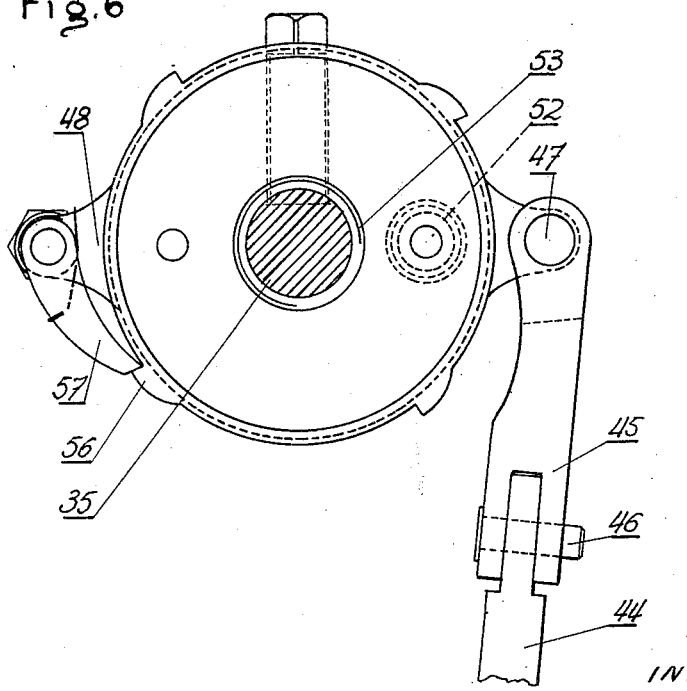
Figure 6 is a view on an enlarged scale of a part of Figure 3.

As shown more particularly in Figures 3 and 6, on the edge of the disc 50 are provided four teeth such as 56 with which can engage a pawl 57 pivoted to the periphery of the loose disc 48.

A safety device is provided for the purpose of preventing the cam shaft 35 from rotating as long as one of the containers 12 or 13 is not quite full. This device comprises substantially a disc 58 (Figures 2 and 3) secured to the shaft 35 and comprising four shoulders 39 which can strike against the lip 60 of a lever 61 pivoted about a fixed pin 62 and pivoted on the other hand at 63 to the end of a rod 64, the other flattened end of which is in contact with one face of a diaphragm 66, the other face of which is exposed to the pressure acting in the feed manifold 23. A spring 67 always tends to move the diaphragm in a direction opposite to that of the action of the said pressure.

A second safety device is provided for preventing the rotation of the shaft 35 as long as one of the dosing containers is not quite empty, that is to say, as long as liquid continues to flow through the distributing manifold 24. To this end, to the said manifold 24 is connected a chamber 68 (Figure 4) containing a float 69 pivoted to the end of a lever 70 pivoted about a fixed pin 71 and terminating at its other end in an abutment 72 adapted to engage the front of one of the four shoulders 73 on the periphery of a disc 74 secured to the shaft 35.

The working of the apparatus thus described is as follows:

Let it be assumed that the two containers 12 and 13 are completely empty. The pump 15 is started by means of the crank 14; and the liquid will then be delivered into the pipe 21, into the air separator 22 and the feed manifold 23. With the parts in the position shown in Figure 2, the cam 34 corresponding to the cock of the pipe 17, will have its cam rises away from the roller 33 (not visible) mounted on the end of the lever 31 operating the cock in question, so that the latter will be closed. On the contrary, the cam 34 corresponding to the feed conduit 18 of the container 13, will have one of its rises in contact with the roller 33, and the corresponding cock 25 will be open. The liquid delivered into the manifold 23 will therefore rise into the dosing container 13.

The rotation of the pump spindle 38 is transmitted to the eccentric 41 which drives or rocks the connecting rod 44 and the small connecting rod 45. It follows that the disc 48 will be caused to rock or rotate alternately in both directions.

As the said disc 48 is clamped between the two discs 49 and 50, fast on the shaft 35, it will have the tendency to transmit its movements to the said shaft, but the pressure acting in the feed manifold 23 is relatively low so that the diaphragm 66 will not be pushed back, and the disc 58 will have one of its shoulders 59 engaging at 60 with the lever 61, whilst the shaft 35 held on the other hand by the ratchet wheel 36 will be thus completely locked, and the disc 48 will slip between the discs 49 and 50.

But as soon as the container 13 is full, the pressure will rise suddenly in the manifold 25, the diaphragm 66 pushed back will raise the lever 61 and disengage the disc 58, so that the shaft 35 will be able to rotate in one direction. At the first oscillation of the disc 48, the shaft 35 is started rotating, and its movement is assisted by the action of the rollers 33 which springs 28 of the cocks cause to descend the slope or track of the bosses of the two cams 34 which kept them apart. As, however, the shaft 35 has slightly turned at the next oscillation, the pawl 57 of the disc 58 meets one of the teeth 56 of the disc 50 so that the shaft 35 will be forced to rotate in spite of the force which has to be supplied for acting on the two levers 31 against the action of the two corresponding springs 28.

It will be seen therefore that the movements which have taken place consist firstly in the closing of the cocks of the pipes 18 and 19 and then in the opening of the cocks of the pipes 17 and 20. As the pipe 17 is open, the liquid begins to rise into the container 12, whilst the liquid from the container 13 flows through the pipe 20 into the distributing manifold 24.

Part of the liquid in the manifold 24 enters the chamber 68 and raises the float 69 so that the lip 72 of the lever 70 engages one of the shoulders 73 of the disc 74 and locks the shaft 35 even if, the container 12 being full, the lever 61 were disengaged from the disc 58.

The rotary movements of the shaft, obtained as before by the friction disc 48 and its pawl 57 can take place therefore only when all of the liquid in the container 13 has flown into the manifold 24 and the float 69 has dropped back.

It will be seen therefore that in order to work the apparatus, it is sufficient to operate the pump 15 without any other operation. This pump should always be provided with a by-pass device such as 75 which avoids dangerous excessive pressure in the delivery pipe 21 and in the manifold 23 connected to it.

In the event of the liquid to be distributed being supplied to the distributor under pressure, it becomes unnecessary to act on the crank 14. In fact the rotary pump 15 can then work as a rotary motor and execute automatically the movements required for the proper working of the distributor.

An important feature of the apparatus just described should be mentioned. This feature is that the rod 29 of each cock passes with a tight joint 76 through a flexible diaphragm 77 secured by its edge to the body 25. This enables the movement of the rod 29 to take place without any danger of leakage, whatever be the nature of the liquid distributed.

Figure 7:
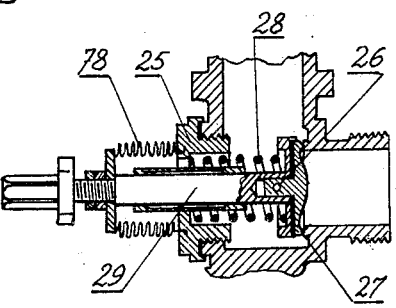
Figure 7 shows a modified construction of a tight joint device for the cock.

As shown in Figure 7, the diaphragm 77 could be replaced by an extensible tube 78 enabling the rod 29 to make movements of a larger amplitude.

I claim:

1. A device of the character described comprising in combination, a liquid distributor having inlet and outlet means, a feeding pump for said distributor, an eccentrically movable element operatively associated with said pump and actuated thereby; a cam shaft controlling the inlet and outlet means of the distributor, a friction disk loosely carried upon said shaft, a pair of disks secured to said cam shaft and each disposed on either side of said freely mounted friction disk for clamping the same therebetween, ratchet means between said friction disk and one of the disks secured to the cam shaft; and means establishing connection between said friction disk and eccentric element, whereby the latter transmits movement to the frictional disk causing rotation of the cam shaft.

2. A device of the character described comprising in combination, a liquid distributor having inlet and outlet means, a feeding pump for said distributor, a rotatable cam shaft for controlling the inlet and outlet means of said distributor, a shoulder disk fixed upon said shaft, lever means cooperating with said shoulder disk and engageable therewith for holding the same against movement thereby locking the shaft, and a flexible diaphragm operatively associated with said feeding pump and acted upon by the pressure created by the pump, said diaphragm being connected to the lever means whereby to actuate the latter and release the shaft when a determined pressure exists.

In witness whereof I have hereunto set my hand.

JOSEPH JEAN MARIE GUEUX.